United States Patent [19]

Bowen

[11] 4,202,320
[45] May 13, 1980

[54] SOLAR ENERGY COLLECTOR ASSEMBLY

[75] Inventor: John C. Bowen, Huntingdon Valley, Pa.

[73] Assignee: Ametek, Inc., Paoli, Pa.

[21] Appl. No.: 847,250

[22] Filed: Oct. 31, 1977

Related U.S. Application Data

[63] Continuation-in-part of Ser. No. 654,407, Feb. 2, 1976, abandoned.

[51] Int. Cl.² ............................................... F24J 3/02
[52] U.S. Cl. ............................................... 126/447
[58] Field of Search ................ 126/270, 271; 237/1 A

[56] References Cited

U.S. PATENT DOCUMENTS

| | | | |
|---|---|---|---|
| 2,705,948 | 4/1955 | Rostock | 126/271 |
| 3,918,430 | 11/1975 | Stout et al. | 126/271 |
| 4,003,363 | 1/1977 | Grossman | 126/271 |

Primary Examiner—James C. Yeung
Attorney, Agent, or Firm—Miller & Prestia

[57] ABSTRACT

An improved solar energy collector assembly with a multiple glazed outer face, a flat collector member and an insulated bottom and side enclosure is provided with significantly enhanced thermal efficiency due to the mounting of the heat collector member and one or more inner glazing or transparent sheets in a manner to minimize conductive heat losses from this part of the assembly to the remainder of the assembly.

13 Claims, 8 Drawing Figures

SOLAR ENERGY COLLECTOR ASSEMBLY

This is a continuation-in-part of U.S. Pat. application Ser. No. 654,407 filed Feb. 2, 1976, now abandoned of common inventorship and assignment herewith.

This invention pertains to an improved solar energy collector assembly and more specifically to a solar energy collector assembly in which a heat exchange fluid is heated by solar energy with a higher degree of efficiency due to inherently reduced heat losses in the assembly design.

A variety of solar energy collector assemblies have been disclosed in the prior art. Many of these assemblies include a solar energy collector member in a thermally insulated housing with one or more transparent sheets on the outer face thereof to prevent heat loss from the collector member back to the atmosphere. Ideally, the collector members operate at a relatively high temperature, in many cases on the order of 200°-300° F. Good thermal efficiency requires some means to prevent heat loss from the collector member back to the atmosphere. A single transparent sheet, typically glass overlaying the collector member is somewhat effective for this purpose. A double or multiple layer of transparent sheets, again typically glass, is much more effective due to the relatively low thermal conductivity of a vacuum or air entrapped between the two or more transparent sheets.

For similar reasons, these solar energy collector members have also been enclosed in a bottom housing, from which the member is insulated to prevent heat loss.

In all cases, care is taken to insulate as many of the assembly components as possible to prevent thermal loss paths from the collector member to outer surfaces of the assembly.

Nevertheless, there remains a continuing need to provide still more efficient solar energy collector assemblies, and more particularly such assemblies wherein thermal loss paths from the collector member are minimized.

It is therefore a general object of the present invention to provide such as improved solar energy collector assembly and specifically to provide such an assembly wherein the tendency toward heat loss due to thermally conductive paths from the collector member to other parts of the assembly, particularly the outer parts of the assembly, is minimized.

These objects, and others which will be apparent in the course of the subsequent description of this invention are met, briefly, by a solar energy collector assembly which includes side and bottom housing sections, with a collector member overlying the bottom section and a first inner transparent sheet and a second outer transparent sheet in turn overlying the collector member. The outer transparent sheet, typically glass, forms with the side housing sections, an enclosure for the assembly. The essential feature of the present invention is that the side or bottom of the enclosure includes a plurality of low thermal conductivity projecting mounts, which support the collector member and the first or inner transparent sheet. Insulating material surrounds these mounts and otherwise fills the space below and to invention sides of the collector. In this manner, the present inventin minimizes heat loss within the assembly by more effectively thermally isolating the inner transparent sheet and the collector member from the front of the assembly, thus minimizing heat loss by reradiation to the atmosphere.

Preferably, the collector member and at least the inner transparent sheet adjacent to it comprise a subassembly which is supported by mounts projecting from the side walls of the assembly. In this embodiment, the bottom of the housing, consists simply of a non-rigid, non-load-bearing covering material. In this manner, this side mount supported assembly provides the thermal characteristics which are the objective of the present invention in an assembly which may be manufactured more economically than the bottom mount embodiment of the invention.

In both embodiments, the mounts upon which the collector and inner transparent sheet are supported are composed of material which is a relatively poor thermal conductor, such as low density plastic or stainless steel rods.

These assemblies of the present invention differ from the prior art in the mounting of the collector member and inner transparent sheet in a manner to thermally isolate them more effectively from the assembly enclosure and primarily from the outer re-radiative surface. In the otherwise similar prior art assemblies, the collector member and inner transparent sheet are secured or mounted to one or both of the outer transparent sheet and the side enclosure sections usually by mounting means extending about the complete periphery of the mounted member. But no such prior art assemblies are known in which the inner collector member and inner transparent sheet are both thermally isolated from the housing (and particularly from the part of the enclosure exposed to solar radiation) of the assembly by virtue of a plurality of discrete mounts and the location of such mounts to minimize heat loss paths.

Still better thermal insulation may be provided with additional sheets of glazing or transparent material, such as glass, interposed between the solar collector member and the outer transparent sheet. Thus a total of three or more sheets of glass may overlay the solar collector member, with some or all of the additional interposed glazing or transparent sheets also supported by the plurality of mounts projecting upwardly from the bottom section of the enclosure or inwardly from the sides of the enclosure.

In the preferred form of this invention, the solar collector member is a flat metallic member with a high efficiency solar energy absorption coating, such as that disclosed and claimed in U.S. Pat. No. 3,958,554, of common assignment herewith. Preferably also, the solar energy collector member includes conduits for heat exchange fluid on the reverse side thereof and means for introducing heat exchange fluid to and removing the exchange fluid from the conduits.

This invention may be better understood by reference to the following detailed description thereof taken in conjunction with the appended claims and the accompanying drawings, in which:

Figure 4:
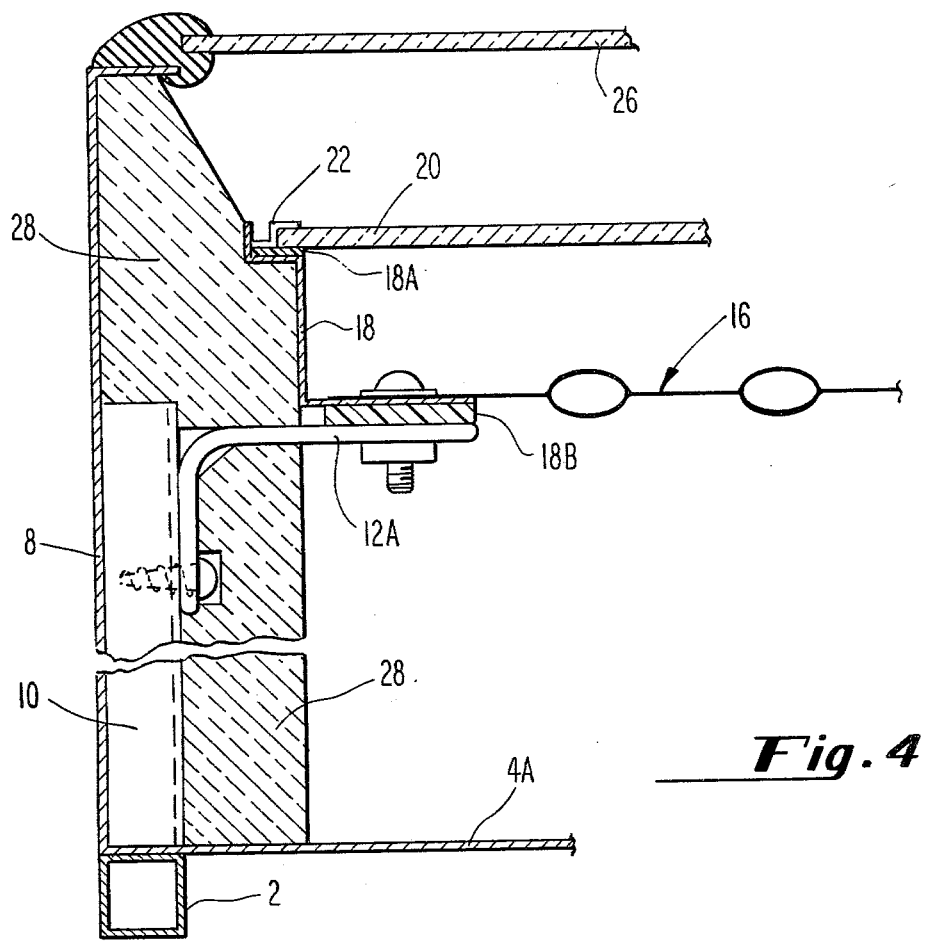
FIG. 4 is a detailed expanded view of a part of an assembly, similar to that shown in FIGS. 1–3, but modified with respect to the mounting support thereof and this depicting the preferred embodiment of the present invention.
Figure 5:
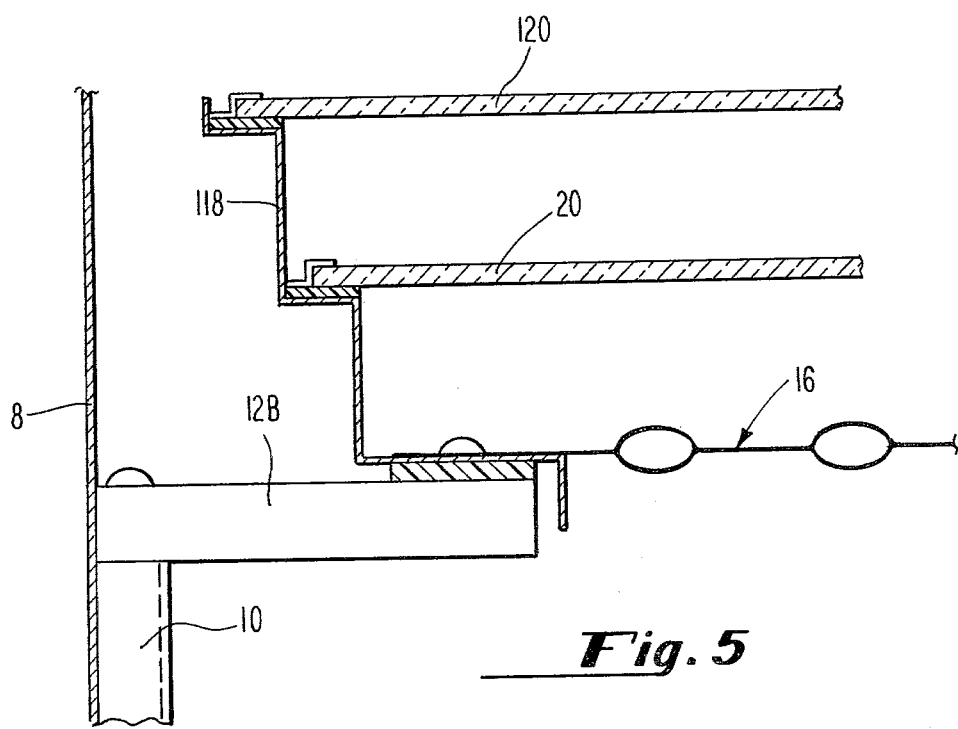
Figure 6:
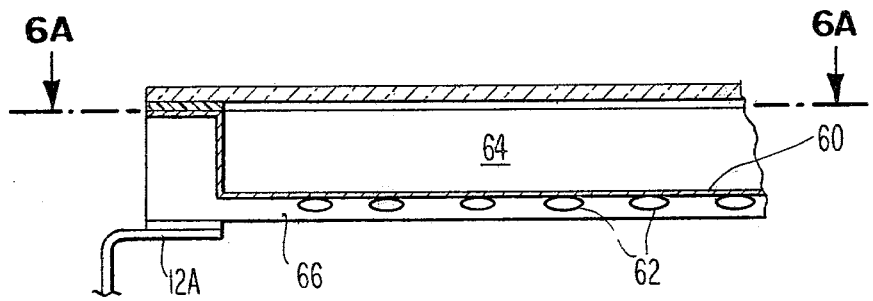
Figure 6A:
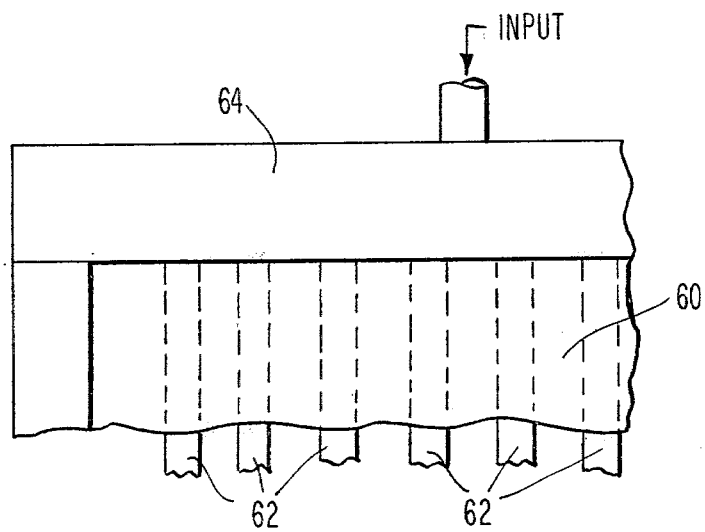

FIG. 5 is a detailed expanded side sectional view of an invention embodiment similar to that shown in FIG. 4 but differing only by the inclusion of a slightly modified support structure and an additional, thermally insulated transparent sheet 20A; and FIGS. 6, 6A (which is a top view of the assembly portion shown in FIG. 6) and 7 depict still other possible modifications of the primary sub-assembly seen in FIG. 4.

Figure 1:
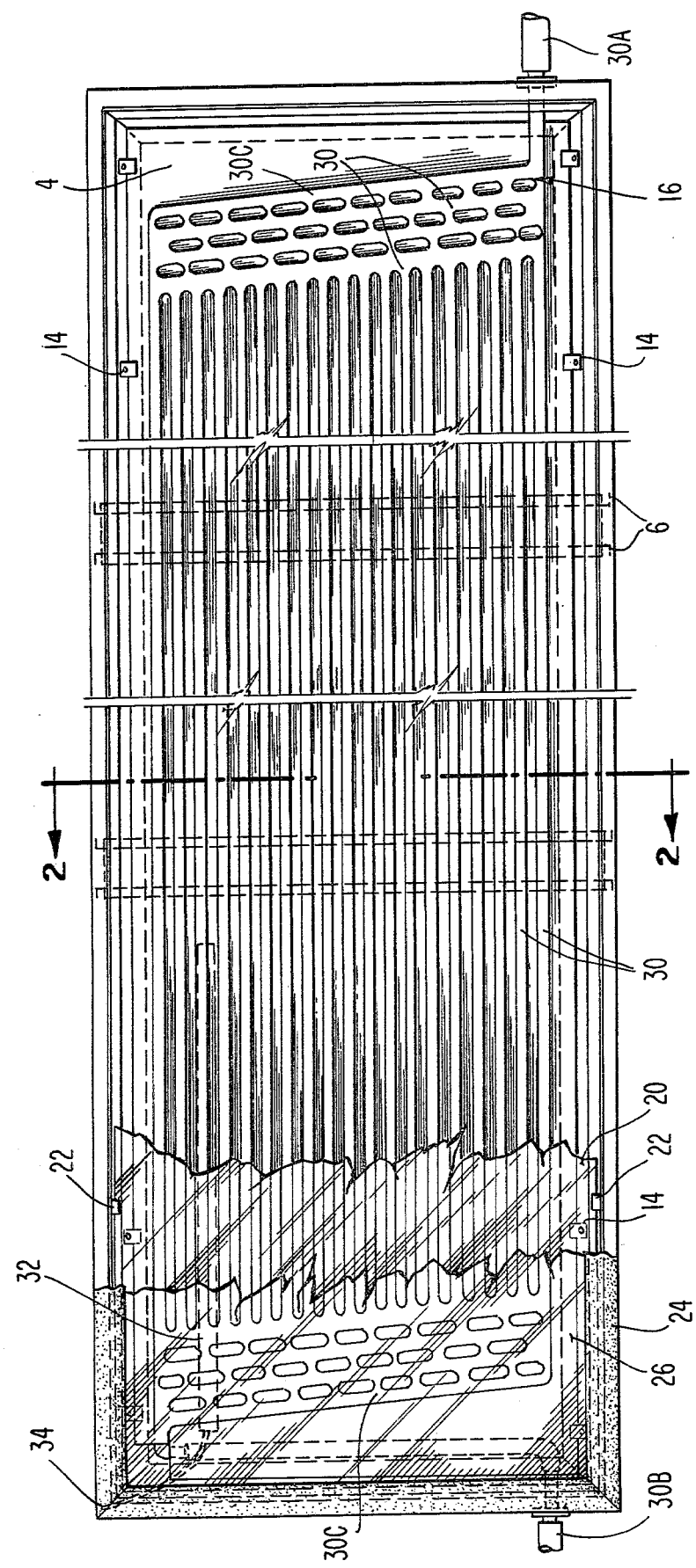
FIG. 1 is a top view, partially cut away, of a solar energy collector assembly in accordance with the present invention.
Figure 2:
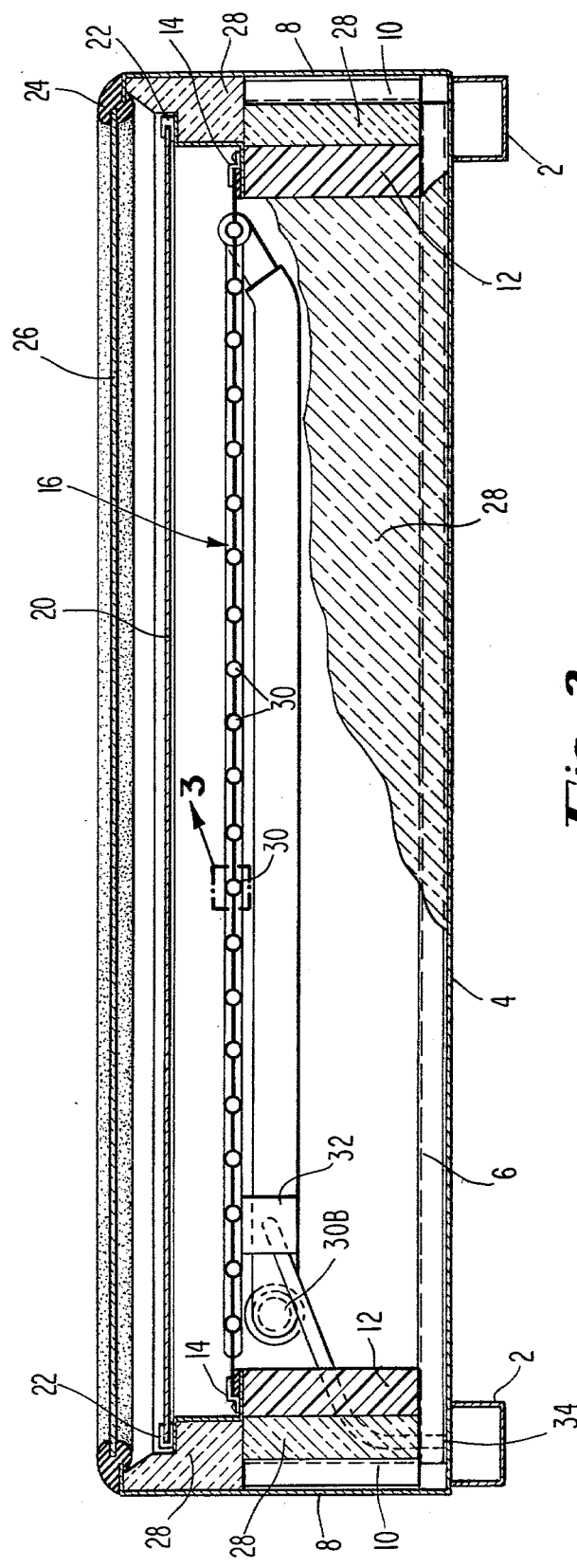
FIG. 2 is a sectional view in the plane 2—2 of the assembly shown in FIG. 1.
Figure 3:
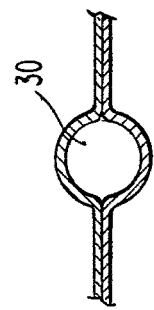
FIG. 3 is a detailed expanded view of a part of the assembly shown in FIGS. 1 and 2.

Referring more specifically to FIGS. 1, 2 and 3, there is shown assembly mounts 1, bottom housing section 4, with transverse rigidity-imparting channels 6, spaced along the length thereof, and side housing sections 8, also including rigidity-imparting channels 10. Projecting upwardly from bottom housing section 4 are a plurality of collector member mounts 12, typically plastic poles of relatively low thermal conductivity. Secured to mounts 12 is a sub-assembly, consisting of retainers 14, solar energy collector member 16, inner glazing support 18, and an inner transparent sheet 20, (typically glass) which overlies solar energy collector member 16 and is retained in a gasket 22 on inner glazing support 18.

At the upper limit of side housing sections 8, a mating gasket 24 is provided, within which an outer transparent sheet 26 (also typically glass) is retained.

Insulation 28 is provided to more effectively thermally isolate the sub-assembly, which includes collector member 16 and inner transparent sheet 20, from the assembly housing.

Collector member 16, in the preferred form of the present invention, includes a high efficiency solar energy collector coating on the outer surface thereof and the heat absorbed in collector member 16 is transmitted to a heat exchange medium which passes through conduits 30 in collector member 16, which also includes an inlet 30A and an outlet 30B for introducing and removing heat exchange fluid to and from the conduits 30 of collector member 16. A dessicant tube 32 (i.e., a tube filled with dessicant) and an outlet drain 34 are provided to prevent condensation in the panel assembly.

Also in accordance with one preferred form of the present invention, and as better seen in FIG. 3, collector member 16 is formed by pressing together, and typically brazing or pressure welding, thin metallic sheets, such as copper, formed such that upon engagement of the sheets, a plurality of conduits 30 and heat exchange medium manifolds 30C are provided.

The preferred form of the invention is otherwise shown, with respect to the design aspects of the enclosure and housing assembly, in FIG. 4. Referring specifically to FIG. 4, there will be seen an assembly in which like elements are numbered as in the similar view of the first described embodiment in FIG. 2. In the preferred embodiment of FIG. 4, however, the transverse rigidity-imparting channel 6 in bottom housing section 4 are omitted and instead, bottom member 4A consists of a thin, non-loadbearing cover sheet. The FIG. 4 embodiment also differs by the omission of upwardly projecting collector member mounts 12.

In this embodiment, a plurality of collector member mounts 12A project inwardly from the side of the enclosure mounted on the rigidity-imparting channels 10 in the side housing section 8. Inwardly projecting collector member mounts 12A are comprised of relatively low thermal conductivity material such as stainless steel rods, and mounted thereon is the sub-assembly of the inner transparent sheet 20 solar energy collector 16 and inner glazing support 18. Insulating gaskets 18A and 18B further limit heat loss flow paths within the inner glazing 20, support 18 and collector 16 sub-assembly. Other details of the assembly shown in FIG. 4 are similar to those described with respect to FIGS. 1–3.

In FIG. 5, a further modification of the subassembly embodiment shown in FIG. 4 is seen. More particularly, a plurality of inwardly projecting low thermal conductivity plastic mounts 12B are utilized in this embodiment to support the collector plate inner glazing sub-assembly, consisting in this embodiment of plate 16 inner glazing 20, a second inner glazing layer 120 and a support member 118 is disposed about the periphery of collector plate 16 and upon which are supported inner glazing 20 and second inner glazing 120.

Figure 7:
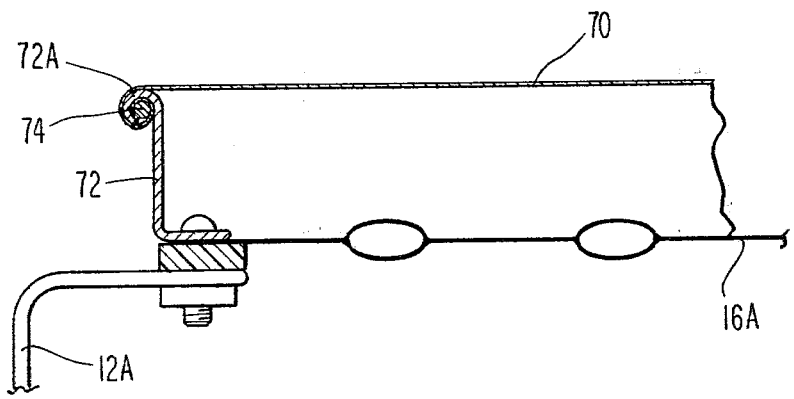

FIGS. 6 and 7 show still other modifications of the sub-assembly embodiment described with respect to FIG. 4. More particularly, in the embodiments of FIGS. 6 and 7, the collector plate is bent upwardly at its periphery to provide the support for the first or inner transparent sheet or glazing.

Referring specifically to FIGS. 6 and 6A (FIG. 6A being a plan view in the plane 6A—6A of the sub-assembly shown in FIG. 6), there is seen a modified collector plate design including a flat sheet 60 to the underside of which are soldered flattened tubes 62 through which heat conducting fluid is passed from an inlet manifold 64 to a similar outlet manifold, not shown, the tubes 62 communicating with both of said manifolds. The space below and surrounding collector plate 60 and tubes 62 and between the manifold 64 and the opposing manifold, not shown in FIG. 6, is filled with insulation 66, as in other embodiments of the invention.

In the sub-assembly embodiment shown in FIG. 7, collector plate 16A, mounted upon sub-assembly supports 12A, as in the embodiment of FIG. 4, is secured to a glazing support 72 adapted to receive and hold in tension inner transparent sheet or glazing 70 consisting of transparent film, such as Teflon fluorinated ethylene propylene polymer, or other similar films. To that end, inner glazing support 72 includes a turned upper end 72A forming a channel into which is snap fit a rod-like retainer 72 about which the end of inner glazing film 70 is wrapped and retained by friction.

While this invention has been described with respect to specific forms and embodiments thereof, it should be understood that it is not limited thereto and that the appended claims are intended to be construed to cover not only the illustrated and described embodiments but also other variations and embodiments which may be made by those skilled in the art without departing from the true spirit and scope of this invention. As is apparent from the foregoing description, the inventive concept involved here is to thermally isolate hotter portions of a solar collector assembly from the front thereof by the use of low thermal conductivity mounts, by the use of a plurality of such mounts, to avoid the greater heat loss flow path of a continuous support member, by the use of such mounts connected to assembly components other than the front face to avoid re-radiative heat losses, and by the inclusion of an inner glazing support and inner glazing which is substantially thermally isolated from at least the front of the assembly along with the collector. Other extensions of this inventive concept include the use of discontinuous structural members for the side enclosure, in one or more sides of the overall collector assembly so as further to reduce heat loss flow path to the front of the assembly. For example, the use of tubular members or trusses to provide the necessary structural support and rigidity in the side members may be used, in conjunction, of course in all cases with a continuous, though not necessarily rigid or structurally supporting, closure material such as is used in the bottom closure 4A of the embodiment of the present invention shown in FIG. 4.

I claim:

1. In a solar energy collector assembly consisting of a housing having side and bottom sections, a solar energy collector member overlying said bottom section, a first inner transparent sheet overlying said member, and a second outer transparent sheet overlying said first transparent sheet, said second sheet being attached to said side housing sections and forming with said side and bottom sections an enclosure for said assembly, the improvement wherein said first transparent sheet and said energy collector member are thermally insulated from and spaced from the side and bottom housing sections and the second transparent sheet, a plurality of low thermal conductivity projections extending from said housing inwardly, said collector member and said first inner transparent sheet contacting and being supported by said projections at spaced locations about the periphery thereof, the space to the side and below said collector member and surrounding said projections being filled with thermal insulation material.

2. An improved solar energy collector assembly, as recited in claim 1, wherein said first and second transparent sheets are glass and said solar energy collector member is a generally flat member with a high efficiency solar energy absorption coating on the surface thereof facing said transparent sheets and conduits for a heat exchange fluid on the reverse side thereof, with means for introducing heat exchange fluid to said conduits and for removing said heat exchange fluid from said conduits.

3. An improved solar energy collector assembly, as recited in claim 2, further including at least one additional transparent sheet interposed between said first transparent sheet and said second transparent sheet.

4. An improved solar energy collector assembly, as recited in claim 3, wherein said additional transparent sheet is also insulated from and spaced from said side and bottom housing sections and supported by said projections.

5. An improved solar energy collector assembly, as recited in claim 2, wherein said projections project upwardly from the bottom section of said enclosure.

6. An improved solar energy collector assembly, as recited in claim 2, wherein said projections project inwardly from the side section of said enclosure.

7. An improved solar energy collector assembly, as recited in claim 2, wherein said projections consist of a plurality of plastic mounting members.

8. An improved solar energy collector assembly, as recited in claim 2, wherein said projections consist of a plurality of stainless steel rods.

9. An improved solar energy collector assembly, as recited in claim 2, wherein said inner transparent sheet is spaced from said collector member and supported in said spaced relationship by a support member, said support member and said collector member in turn being supported by said projections.

10. An improved solar energy collector assembly, as recited in claim 9, including a second inner transparent member interposed between said first inner transparent member and said outer transparent member, said second inner transparent member being supported by and spaced from said first inner transparent sheet by a further extension of said inner transparent sheet support member.

11. An improved solar energy collector assembly, as recited in claim 2, wherein at spaced locations about the periphery of said collector member, portions of the edge of said collector member are turned upwardly toward said inner transparent member and form a support member upon which said inner transparent sheet is mounted.

12. An improved solar energy collector assembly, as recited in claim 2, wherein said inner transparent sheet consists of a transparent film held in tension and supported by a support member extending upwardly from said collector member.

13. An improved solar energy collector assembly, as recited in claim 12, wherein said upwardly extending support member is turned upwardly at its outer end to receive a snap fitting rod member about which an end of said transparent film is wrapped, whereby said film is held in tension in space parallel relation to said collector member.

* * * * *